(12) United States Patent
Thompson et al.

(10) Patent No.: US 10,592,328 B1
(45) Date of Patent: Mar. 17, 2020

(54) USING CLUSTER PROCESSING TO IDENTIFY SETS OF SIMILARLY FAILING HOSTS

(71) Applicant: Amazon Technologies, Inc., Seattle, WA (US)

(72) Inventors: James Michael Thompson, Seattle, WA (US); Marc Stephen Olson, Bellevue, WA (US); Vaibhav Sharma, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 99 days.

(21) Appl. No.: 14/670,114

(22) Filed: Mar. 26, 2015

(51) Int. Cl.
*G06F 11/07* (2006.01)
*H04L 12/24* (2006.01)

(52) U.S. Cl.
CPC ........ *G06F 11/0793* (2013.01); *G06F 11/079* (2013.01); *H04L 41/0631* (2013.01)

(58) Field of Classification Search
CPC . G06F 11/079; G06F 11/0793; H04L 41/0631
See application file for complete search history.

(56) References Cited

U.S. PATENT DOCUMENTS

| 7,721,152 B1* | 5/2010 | Joshi | G06F 11/0709 714/15 |
| 9,336,259 B1* | 5/2016 | Kane | G06F 17/30371 |
| 9,843,472 B1* | 12/2017 | Cogan | H04M 15/70 |
| 2004/0059966 A1* | 3/2004 | Chan | G06F 11/0709 714/48 |
| 2005/0080806 A1* | 4/2005 | Doganata | G06F 11/0709 |
| 2008/0195369 A1* | 8/2008 | Duyanovich | G06F 11/0709 703/22 |
| 2010/0174945 A1* | 7/2010 | Watanabe | G06F 11/0709 714/26 |
| 2011/0131453 A1* | 6/2011 | Fernandess | G06F 11/079 714/37 |
| 2011/0211737 A1* | 9/2011 | Krupka | G06F 17/30265 382/118 |
| 2013/0042147 A1* | 2/2013 | Tonouchi | G06F 11/0781 714/37 |
| 2013/0159778 A1* | 6/2013 | Yabuki | G06F 11/0751 714/37 |
| 2014/0006871 A1* | 1/2014 | Lakshmanan | H04L 41/065 714/37 |
| 2014/0136685 A1* | 5/2014 | Chan | H04L 41/142 709/224 |
| 2014/0325254 A1* | 10/2014 | Mani | G06F 17/30598 714/2 |
| 2015/0033086 A1* | 1/2015 | Sasturkar | G06F 11/0709 714/57 |
| 2017/0315856 A1* | 11/2017 | Tee | G06F 11/0793 |

* cited by examiner

*Primary Examiner* — Yolanda L Wilson
(74) *Attorney, Agent, or Firm* — Davis Wright Tremaine LLP

(57) ABSTRACT

Data, attributes, and metrics from unavailable resource hosts may be collected and used for cluster analysis in order to correlate the different hosts and group similar hosts into clusters. The clusters may be ranked based on the collected information and used to provide a simple way to identify shared failure modes among the unavailable hosts. By identifying the hosts of each cluster, shared failures can be corrected for large groups of hosts at the same time, enabling the hosts to return to operational states.

21 Claims, 8 Drawing Sheets

| HOST ID | DEVICE TYPE | TEMPERATURE | MANUFACTURER | SPATIAL LOCATION | S.M.A.R.T. ERRORS | RECEIPT DATE |
|---|---|---|---|---|---|---|
| A | Host Class ABC | 27°C | HoneyCrisp | Region 1, DZ A | 7 | 1/3/2014 |
| B | Host Class ABC | 27°C | HAL | Region 1, DZ A | 128 | 7/3/2014 |
| C | Host Class XYZ | 23°C | HoneyCrisp | Region 2, DZ B | 65 | 1/3/2015 |
| D | Host Class LMN | 23°C | Redmond | Region 2, DZ A | 11 | 9/1/2014 |
| E | Host Class XYZ | 24°C | HoneyCrisp | Region 2, DZ A | 88 | 2/1/2015 |
| ... | ... | ... | ... | ... | ... | ... |
| Z | Host Class ABC | 23°C | HAL | Region 1, DZ A | 42 | 11/12/2014 |

FIG. 3

USING CLUSTER PROCESSING TO IDENTIFY SETS OF SIMILARLY FAILING HOSTS

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider as needed and depending on their needs.

In some cases, a hardware device in the network may malfunction, fail, or indicate possible failure independently of another device in the network. However, in other cases malfunctions, failures, or possible failures in devices may occur at a scale and become network-wide events. Further, in some cases the malfunctions may be interrelated and may have common causes or may be due to the conditions of the devices or interactions between the devices. It is of importance for the computing resource service provider to identify any possible device problems at scale and address the problems or potential problems. Such identification can be difficult given the numbers of computing devices often managed by organizations such as computing resource service providers

BRIEF DESCRIPTION OF THE DRAWINGS

Various embodiments in accordance with the present disclosure will be described with reference to the drawings, in which:

FIG. 3 is an illustrative example of a data structure showing resource host attributes in accordance with at least one embodiment;

DETAILED DESCRIPTION

Figure 1:
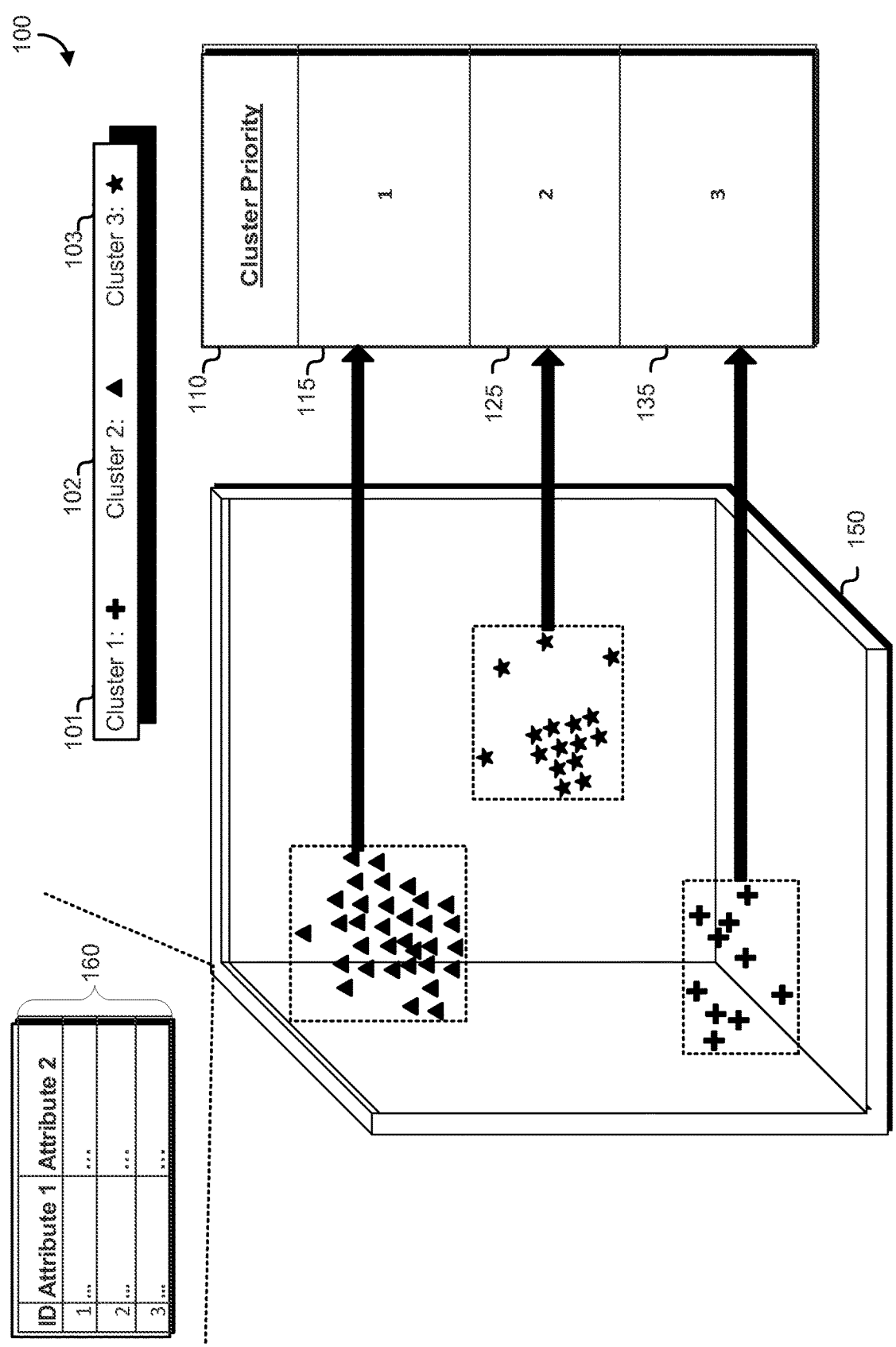
FIG. 1 is an illustrative example of data zones including a plurality of hosts connected to a computing resource service provider in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include comparing identified resource hosts in abnormal operation in a computing resource service provider network using dimensional algorithms, identifying causes for the unavailability, and resolving the problems based on clustered outputs of the dimensional algorithms. A resource host, also referred to as a physical host or a physical network node, may be in abnormal operation (e.g., unavailable) for a myriad of reasons, for example, the host may be offline or removed from production.

Example embodiments presented herein provide for a method, system, and computer-readable medium for cluster processing large amounts of attribute data related to any number of hardware devices in order to provide a manageable approach to identifying and rehabilitating related groups of similarly failing or troubled network nodes, which have been taken out-of-service as being a known, problematic device.

In example embodiments, an unavailable host may transmit a property report including host property data for the host and any devices or components thereof, to be sent to an on-demand storage service or filtering engine in order to be compiled with other property data of additional hosts. The host property report for an unavailable host may be used by a computing resource service provider to monitor and analyze problems or failures in a host that have caused the service provider to remove the host from production. It is common that a service provider may identify property data that indicates a possible or imminent failure of a host that is currently in production, and decide to remove the host from production without identifying an actual problem or attempting to find a solution for the failure. In other words, a service provider, at any given time, may have a large number of host devices removed from the network without addressing the reasons for removal.

To reduce the large capital expenditure that is accumulated due to unavailable devices, example embodiments enable a service provider to utilize a resource host property report including data, statistics, specifications, attributes, and/or metrics from a plurality of unavailable hosts as input parameters in a clustering algorithm. These metrics may be used for cluster analysis to correlate attributes among the different hosts and compare the values associated with the attributes in order to identify shared failure modes, to determine methods of rehabilitation from the failures modes, to prioritize decisions to act out the rehabilitation of such failures, and/or to deploy the rehabilitation to the correlated hosts in order to resolve more problems amongst more hosts at the same time.

The host property report may include utilization data or statistics for one or more resource hosts. The host property data included in the host property report may be system property report data of the physical hosts, where the values of such data are used as input criteria for a clustering algorithm. Such data can be divided into three primary groups: categorical data, such as discrete variables; time-based data, such as arrival time; and numerical data, such as number of errors. For example, data used as inputs for the dimensional algorithms or clustering algorithms may include Linux system property report data, including the number of read or write requests per second issued to the physical hosts, a time/date of the last link-cable replacement, the manufacturer of a hard drive, the manufacturer of a network card, the software version running the host, spatial location of the host, temperature/humidity in the host location, hardware batch identifiers, date received from third-party, self-monitoring, analysis, and reporting technology (S.M.A.R.T.) errors, device type, and many other hardware or device characteristics, attributes, or categories that may be used according to example embodiments presented herein.

Resource host property data may originate from a virtualization layer of a virtualization platform and may be reported by application programs equipped with operational or executable instructions that cause virtualization to be performed. In addition, resource host property data may be reported by application programs equipped with operational or executable instructions for performing billing or networking tasks.

To identify resource hosts as observed on a large scale, resource host property data may be reported, and a clustering process may be applied to the resource host property data in order to produce a plurality of clusters of detected correlated data, where such data illustrates groups of resource hosts that are related based at least in part on observations of their property data values. The cluster-processed data may be divided into subsets, where each subset is stored in an on-demand data storage service with similar subsets. A network administrator or an automated process may analyze the on-demand data storage services to identify characteristics, such as size of resources within the data storage, which would make it beneficial or easier to diagnose the root cause of the unavailable hosts in order to reenter the resource hosts into production.

FIG. 1 is an illustrative example 100 showing an example outcome of cluster processing performed on a plurality of hosts using resource host property data in accordance with at least one embodiment. In FIG. 1, a three-dimensional clustering is shown for illustration and for ease of description but it is recognized that the number of dimensions used by a clustering algorithm may be any integer.

A resource host may be a physical host, such as a computer, a server, a host machine, or a sensor. Resource host property data may be compiled in data structure 160 and may include attributes related to hardware resource utilization, diagnostic information, performance information, and the like. For example, the data structure 160 includes identification information for the resource host, and two columns for attributes (e.g., Attribute 1 and Attribute 2). The values for each attribute, associated with each host, may be entered as input into a clustering algorithm in order to determine possible groups of hosts that are related to each other based on interpretations of the attribute values. The plurality of resource hosts may report property metrics to a cluster-processing engine, where the host may be a physical host, such as a computer, a server, a host machine, a network node, a sensor, or other physical component. The host property metrics may be related to hardware resource utilization, diagnostic information, property information, and the like. The data structure (explained in detail below in connection with FIG. 3) may include rows and columns, where the rows each identify a different network device, such as providing a device identifier. The data structure may further include columns, where each column identifies a different attribute related to the device identifier; for example, the attributes in data structure include a hardware type and a manufacturer. The attributes may be entered into a dimensional algorithm, such as a clustering algorithm, in order to analyze the attributes by grouping a set of objects in a manner that shows objects in the same group (e.g., cluster) are more similar (in some sense or another) to other objects in that same group than to other groups (e.g., other clusters).

A cluster-processing algorithm, such as K-means clustering, may be applied to the values in the data structure 160 to yield a plurality of clusters (101, 102, and 103). Values related to the attributes or metrics in the host property data stored in a data structure 160 may be provided as an n-dimensional vector and the n-dimensional vector may be a data point in n-dimensional space. Further, the values may be plotted in an n-dimensional Euclidean space, whereby n represents the number of host property categories. Each cluster generated by a cluster-processing algorithm has an associated centroid and a frequency, whereby the centroid represents the center of the cluster in space; for example, n-dimensional space, and the frequency represents the number of n-dimensional property data vectors in the cluster. Each cluster includes points in the Euclidean space pertaining to similarly disposed or like hosts, whereby two hosts pertaining to the same cluster are expected to be experiencing property conditions having greater similarity than two hosts that pertain to different clusters.

Figure 2:
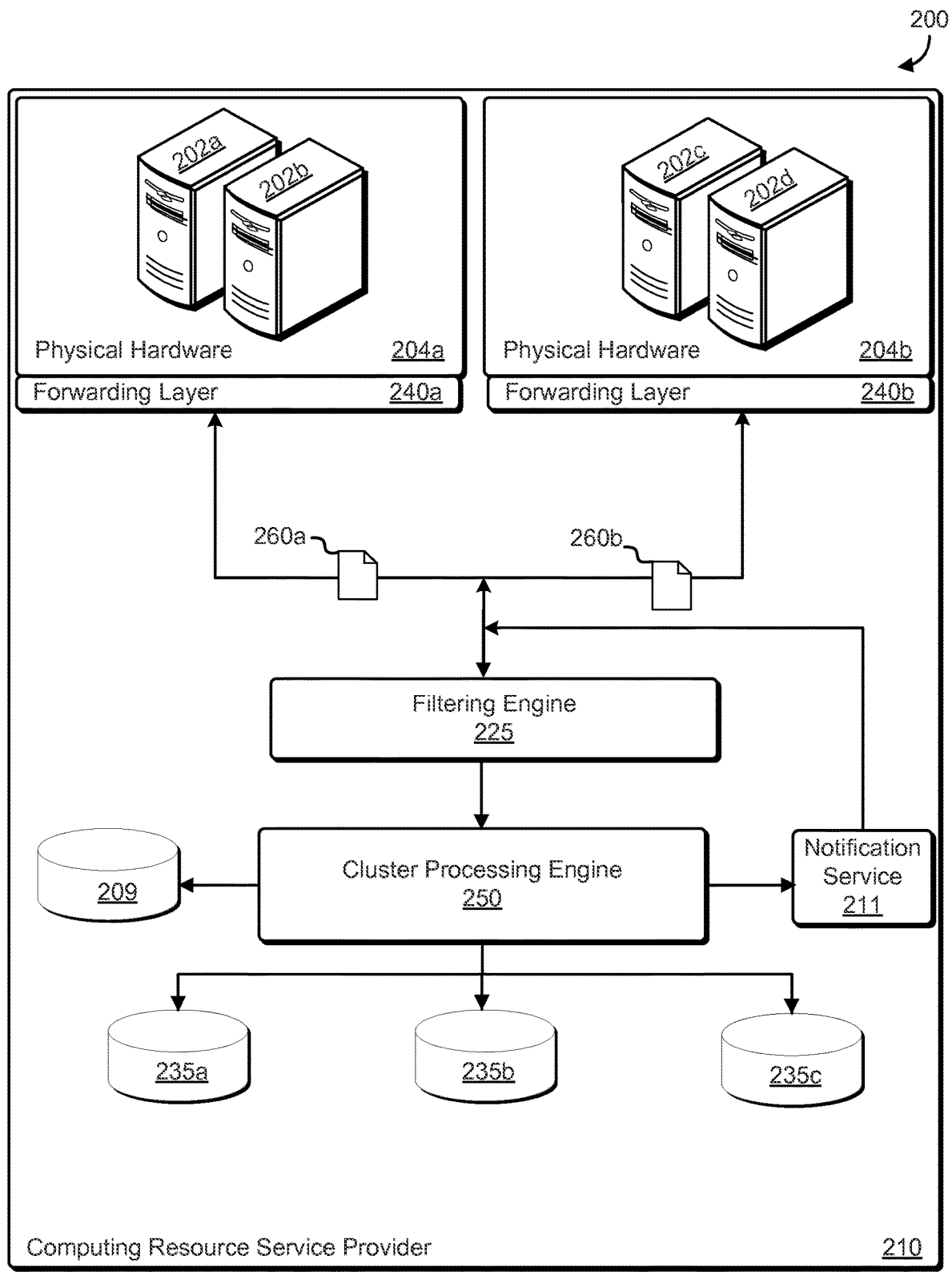
FIG. 2 is an example of a block diagram illustrating a clustering process in which various embodiments can be implemented.

Clustering, as performed by a cluster-processing engine, such as the cluster-processing engine 250 as described and depicted in connection with FIG. 2, is a process that partitions a given data set into homogeneous groups based on attributes of the data set, such that similar objects are maintained in a group and dissimilar objects are maintained in different groups. Clustering can be formulated as a multi-objective optimization problem. For example, the more tightly packed objects of a cluster are, the more likely a single problem, and likely a single solution, will resolve the failure mode of most, if not all, of the objects in that cluster.

Cluster processing may be performed on a plurality or points in n-dimensional space representing property data of a plurality of hosts to yield one or more clusters, where each cluster yielded by cluster processing represents a group of hosts having or experiencing similar property. It should be noted, however, that while Euclidean spaces utilizing Euclidean metrics are provided for the purpose of illustration, non-Euclidean spaces and metrics may be utilized. For example, data may be represented using n-dimensional vectors where the distance between vectors is measured using a non-Euclidean metric. Further, the distance between vectors may be measured using a weighted metric, such as the weighted Euclidean distance.

In FIG. 1, the plot 150 illustrates three clusters; cluster 1 (101), cluster 2 (102), and cluster 3 (103). Each cluster includes groupings of resource hosts, where the hosts of cluster 1 (101) are demarcated with a plus sign, the hosts of cluster 2 (102) are demarcated with a triangle, and the hosts of cluster 3 (103) are demarcated with a star. The hosts grouped in each of the clusters 101, 102, and 103 may each be experiencing abnormalities that have a root cause in common, for example, each of the resource hosts in cluster 2 (102) may all be unavailable or offline for the same one (or more) reasons.

Based, at least in part, on the groupings of the hosts, the clusters provide for a method of ranking or sorting the resource hosts in order to address the problems associated with the cluster of hosts all at once. The clusters may be used to create a priority listing, such as cluster priority list 110, which orders the clusters based on size. For example, based on the number of resource hosts that are shown in each cluster, the priority list may be updated to show the cluster with the greatest number of hosts (cluster 2 (102)) to be of top priority, and entered into the first listing 115. The cluster with the second highest number of hosts (cluster 3 (103)) may be entered into the second listing 125 and the cluster with the fewest number of hosts (cluster 1 (101)) may be entered into the third listing 135. In other example embodiments, additional methods of ranking may be employed. For example, resource hosts may be assigned weights according to importance; the sum of the weights or an average of the weights may be used to rank. Further, the location or region of the resource hosts may be used for ranking.

By ordering the clusters into a priority list, a network administrator, or automatic process, may easily view/process the results and determine, for example, the largest group of hosts, which likely have one or more of the same issues, and prioritize fixing that cluster first, as it would lead to the greatest number of resource hosts being able to be placed back into production. In other example embodiments, any characteristic or property of the hosts may be utilized to choose a priority listing. For example, the priorities could be based on the least number of resource hosts or a number of resource hosts that lay in a certain location. For example, the location of a cluster in Euclidean space may also serve as an indicator of the type of abnormality experienced by the hosts of the cluster or the cause of the abnormality experienced by the hosts of the cluster. Any criteria suitable for categorizing the clusters, such as specific attributes, may also be used to prioritize the clusters. It is noted, that as used herein, an attribute may be a specification, characteristic, metric, or the like that defines a property of an object or resource; attribute may similarly refer to or provide a specific value for a given instance of such an object or resource.

In some example embodiments, the clusters may be prioritized, ranked, ordered, or otherwise placed in a hierarchical structure according to a level or determination of importance of the cluster and/or the hosts defined by or included in the cluster. For example, the prioritization of a cluster may be based on an amount of processing expected to be performed on host machines associated with each cluster, the type of volumes associated with each cluster, a particular customer associated with the hosts defined by the cluster, etc. The prioritization may further be based, at least in part, on additional information or considerations that can be used to measure the importance or significance of a host, cluster, or customer associated with the hosts or clusters.

In alternative example embodiments, diagnostic decisions, such as assessing the resource hosts defined by the clusters, may be based on confidence scores or an economic cost. For example, if one large cluster is identified, but that cluster may have two or three potential common problems among the resource hosts, the potential of resolving the failure or unavailability status may be significantly reduced. Whereas, a smaller, tighter cluster of resource hosts, while not containing as many resources, may only require a single rehabilitation or action, such as a new link cable or a longer cable, would resolve the issues for the entire or a large percentage of the entire cluster. In further example embodiments, a confidence score could be used to prioritize rehabilitation decisions. A rehabilitation suggestion may be provided based on, for example, the outcome of a clustering process or the form of a cluster. The rehabilitation suggestion may include a method of solving the potential problems with the resource hosts. For example, for a large grouping of resource hosts, when two apparent problems exist, an inexpensive component could be exchanged for a more expensive component, and that more expensive component may be replaced in a small percentage of the large grouping in order to identify a possible solution without replacing an expensive component in a large group of hosts.

FIG. 2 shows a block diagram 200 for cluster processing of host property data in accordance with an example embodiment. As described herein, a property report for a physical host may be sent for cluster processing to be used for identifying possible problems or failure modes of unavailable resource hosts.

The computing resource service provider 210 may provide various computing resource services to its customers and other interconnected nodes (not shown). The services provided by the computing resource service provider 210 (disclosed in detail in connection with FIG. 7 and the corresponding description), in this example, include a notification service 211, a cluster processing engine 250, a data storage database 209, a filtering engine 225, and multiple on-demand data storage service 235*a-c*.

Physical hardware 204*a*-204*b* is used by the computing resource service provider 210 for providing computation resources for customers and other interconnected network nodes (not shown). The physical hardware 204*a-b* may include physical hosts 202*a*-202*d*. For the example in FIG. 1, only four physical hosts are shown; however, any number of resource hosts, devices, and hardware components are possible. A host, such as physical hosts 202*a*-202*d*, is a network node that is assigned a network layer host address; generally, the host is a computer or other device connected to a computer network that may provide information resources, services, and/or applications to users or other nodes on the network. Remote program execution and storage services may be provided by a computing resource service provider that employs a plurality of hosts, storage volumes, or other devices to provision computing resources to customers.

The physical hosts 202*a-d* may be any device or equipment configured to execute instructions for performing data computation, manipulation, or storage tasks, such as a computer or a server. A physical host may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications or data transfer protocol. The physical hardware 204*a-b* may also include storage devices, such as storage disks and tapes, networking equipment and the like.

Forwarding layers 240*a* and 240*b* (also referred to as virtualization layers) of platforms (not shown) in the computing resources service provider enable the physical hardware 204*a-b* to be used to provide computational resources. For example, the forwarding layer(s) 204*a-b* may provide host property reports 260*a*-260*b* associated with physical hosts 202*a-d*, respectively. The property reports may not necessarily correlate one-to-one; for example, the forwarding layer 240 may receive data from multiple physical hosts and compile the data from the one or more virtual hosts into one or more host property reports. The host property reports 260*a*-260*b* may include utilization, property or operational information or statistics for the physical hardware 204a-b, physical hosts 202a-d, any element, device or component of the physical hardware 204a-b, such as storage devices and networking equipment, and any physical component operably interconnected to the physical hardware 204a-b.

The information included in the host property reports 260a-260b may be gathered or compiled over an interval of time or taken at one or more snapshots in time. For example, the host property reports 260a-b may include utilization data or statistics for one or more resource hosts. The utilization data or statistics may be captured over an interval of time or at a snapshot in time. The host property data may be indexed by time of data capture or by the host to which the property data pertains and a mapping between host property data and time of data capture or host may be maintained.

A host property report may include data used as inputs for the dimensional algorithms or clustering algorithms (described in detail in connection with FIG. 3). A plurality of host data that is collected over time may be combined into one host property report and sent to the filtering engine 225 at a predetermined time or at a specified rate. For example, four host property reports may include data collected over one day and the four host property reports may be sent at four different times in the day.

The filtering engine 225 may be operably interconnected to or include a collection of computing resources configured to synchronously process requests to store and/or access data. The filtering engine 225 may operate using computing resources (e.g., databases) that enable the filtering engine to locate and retrieve data quickly, so as to allow data to be provided in responses to requests for the data. For example, the filtering engine 225 may maintain stored data in a manner such that, when a request for a data object is retrieved, the data object can be provided (or streaming of the data object can be initiated) in a response to the request. As noted, data in the filtering engine may be organized into data objects and may store numerous data objects of varying sizes. The data objects may have arbitrary sizes except, perhaps, for certain constraints on size. The filtering engine 225 may further maintain a database of data objects (as described and depicted in connection with FIG. 3) for identifying attributes of the host of the service provider, such as physical hosts 202a-d.

The filtering engine 225 organizes the retrieved data into searchable and filterable host property data; for example, the filtering engine may perform feature extraction and translate or transform non-numeric data into a numeric counterpart. To organize the data, the filtering engine, for example, may create a data structure, such as a matrix or database, of host property data, whereby each row of the matrix pertains to a host and whereby each column includes data that pertains to an attribute of the host.

In alternative example embodiments, the forwarding layers 240a and 240b may transmit the host property reports 260a-b to a storage service, such as an on-demand storage service, which may maintain the reports for later retrieval by the filtering engine or other appropriate component. For example, the filtering engine may retrieve property data of the one or more host property reports based, at least in part, on the data capture or data reporting time stored in the index file or the identity of the host to which the property data of the one or more host property reports pertains.

Figure 4:
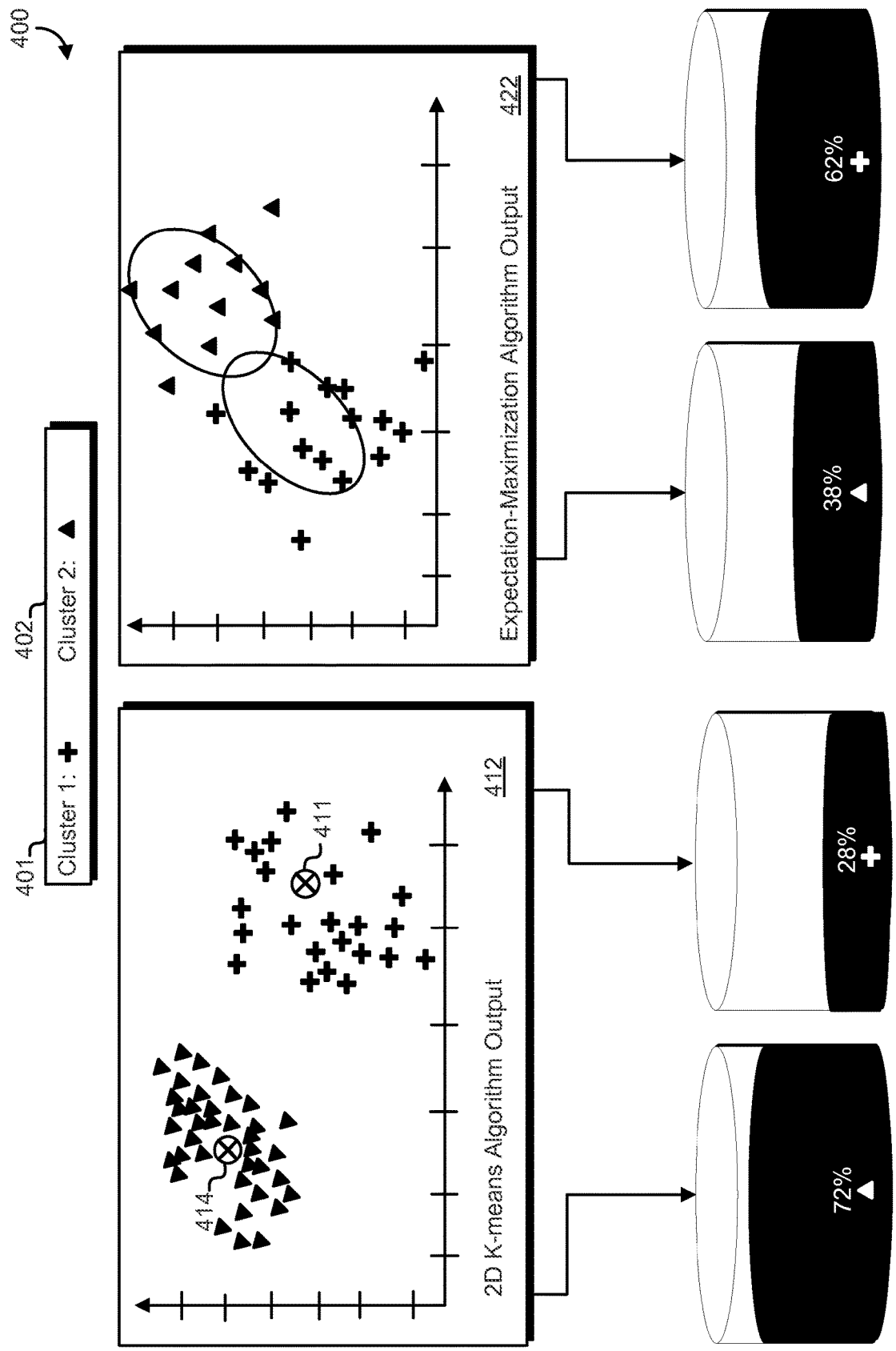
FIG. 4 is an illustrative example comparing the results of cluster processing according to different dimensional algorithms in accordance with at least one embodiment.

The host property data structure (as described and depicted in connection with FIG. 3) is provided to a cluster-processing engine 250 for analysis using a dimensional algorithm or other type of machine learning or data mining algorithm. The output of the cluster processing engine 250 may include audio, visual, and/or graphical data, such as charts or graphs in two or three dimensions (as illustrated in FIG. 4) or may be provided in a data structure, statistics summary (e.g., centroids), or other informational manner. The output, based on the correlations and clustered objects, may be separated into one or more on-demand data storage services 235a, 235b, or 235c, where each of the storage services maintains one grouping of similar objects. The data storage services 235a-c may be reviewed by a network administrator, or by an automated process, to determine next possible actions, such as rehabilitation actions, to perform, if at all, on the resource hosts based on the analysis within the storage services. For example, if three on-demand data storage services 235a-c store three different clusters (e.g., groupings of resource host identifiers with similar attributes based on an outcome of the cluster processing), the clusters may be assessed and the resource hosts defined by those clusters may be rehabilitated.

In further example embodiments, the output, based on the correlations and clustered objects may be transmitted to a notification service 211. The notification service may transmit information related to the clustered resource hosts back to the physical hosts, via the forwarding layers, in order to provide feedback to the hosts. In addition, data output from the cluster-processing engine may be stored in a data storage database 209, which may organize the output in a manner that, for example, correlates the resulting data to be used as historical data, e.g., such as a learning model.

FIG. 3 is an illustrative example of a data structure 300 showing resource host attributes and associated values in accordance with at least one embodiment.

In the example data structure of FIG. 3, the data structure consists of a number of columns (referred to as attributes) and rows that create a database table. The rows, or records, are each particular to one resource host, where attribute 302 is a host identifier (ID). The example embodiment illustrates the host IDs as A, B, C, D, E, . . . Z, where the ellipses are to indicate that the data structure may include any suitable number of rows and attributes as necessary or desired. In practice, the host identifiers would likely be the network layer host address assigned to a network node or an internal identification system based on the computing resource service provider.

The attributes and data values associated with each attribute to be entered into the data structure 300 may come from a resource host property report and include information indicating the resource host or hosts to which the report pertains. Further, the host property report may include an indication of the time when the report was generated or the time or an interval of time when the data of the report was captured, reported, or measured. The resource host property report may include, for each physical host, such as physical hosts 202a-d as described and depicted in FIG. 2, a vector comprising numeric or alphanumeric property data. Each entry in the vector may be assigned to represent property data, metric, metadata of the property data, or other associated information.

The first attribute, or column, is a device type 304, which could be a host class, such as a computer with a network card, one or more hard drives, a video card, and the like. The second attribute in the data structure is a temperature 306 of the device, the third attribute is the manufacturer 308 of the host or at least one component of the host, and the fourth attribute is a spatial location 310 of the host. The fifth attribute is a number and a converted percentile of errors detected by Self-Monitoring, Analysis and Reporting Technology (S.M.A.R.T.) 312 in a monitoring system that is included in hard disk drives and solid-state drives to detect and report on various indicator of drive reliability. The S.M.A.R.T. errors may be measured on a per-disk basis, where multiple hard drives present in the same host may each have their own count of S.M.A.R.T. errors. Other types or categories of errors may also exist as attributes for any number of hosts. The last entry is the receipt date 314, which may be the date on which the host was received from a third-party supplier or dealer.

Based on the attribute values in the data structure, a clustering algorithm can be employed to use some or all of the attributes to determine an output. For example, the attributes could be used to calculate a distance between each attribute, such as the distance between host ID 1 and host ID 2, between host ID 2 and host ID 3, between host ID 3 and host ID 4, and so one, where each resource host will be compared with every other resource host in the data structure. However, example embodiments may also apply where certain rows or columns are intentionally removed from comparisons for certain data structures.

A data structure for host property may include hundreds or thousands of attributes (e.g., property categories) that are measured for each host. When each property category is represented by a dimension in Euclidean space, a host having metrics that are collected for each property category may be represented as a point in the Euclidean space. Two hosts having similar property measurements are expected to be close to each other in the Euclidean space, whereas two hosts with somewhat varying property measurements are expected to lie far apart in the space.

FIG. 4 shows an example of a block diagram 400 illustrating a clustering algorithm output displaying the results of a clustering process for determined attributes in a Euclidean plane according to two different clustering algorithms. A two-dimensional plane is used for ease of illustration; however, any number of dimensions for the Euclidean space may be contemplated. Specifically, plots 412 and 422 illustrate the cluster processing of resource host property data associated with unavailable resource hosts, such as resource hosts 202*a-d* as disclosed and depicted in connection with FIG. 2.

For example, plot 412 is a two-dimensional visualization of the output of a K-means clustering algorithm performed on data values obtained from a host property report, such as values stored in a data structure 300 described and depicted in connection with FIG. 3. Whereas, plot 422 is a two-dimensional visualization of the output of an expectation-maximization (EM) algorithm performed on the same data values. As shown in plot 412, two clusters, cluster 1 (401) illustrated as a "+" and cluster 2 (402) illustrated as a triangle, can be clearly visualized in a manner that groups the related objects based on their attribute values.

In the example plot 412, the K-means algorithm was performed on a set of data values associated with a plurality of resource hosts, and, based on that analysis, 72% of the resource hosts were grouped into cluster 2 (402) and 28% of the resource hosts were grouped into cluster 1 (401). The plot 412 further illustrates a centroid 414 for cluster 2 and a centroid 411 for cluster 1, indicating, for example, a representative point or host for that cluster. In the example plot 422, the EM algorithm was performed on the same set of data values associated with the plurality of resource hosts, and, based on that analysis, 38% of the resource hosts were grouped into cluster 2 (402) and 62% of the resource hosts were grouped into cluster 1 (401). The data related to the clusters may be stored in databases, such as an on-demand data storage service, in order to provide access to the specific clusters or may further be provided to additional services of the computing service resource provider. In the embodiments described herein, any clustering algorithm other than K-mean clustering may be used including expectation-maximization clustering, Biclustering, among others.

Clusters may be characterized by their boundaries in an n-dimensional space or their associated centroid or frequency. A centroid of a cluster is the geometric center of the vectors of a cluster or the arithmetic mean of the vectors of the cluster and the frequency is the number of vectors or data points of the cluster. In addition, the pairs of cluster have similar frequency counts. It is noted that rules may be set that define the manner in which similar clusters are determined. For example, a maximum distance may be set for determining whether centroids are similar. Clusters may be deemed similar if their centroids are close to each other in distance (for example, based at least in part on a Euclidean, Chebychev, or other metric). The clusters may also be deemed similar if the boundaries of the clusters are within a margin of one another or if the frequencies of the clusters are within an integer of one another. Further, clusters may also be deemed similar if the clusters overlap by a portion or a percentage or according to other criteria.

The resource host property metrics may be an n-dimensional vector for each resource host, whereby each dimension of the n-dimensional vector may represent a property category, for example, a predefined property category. Further, the resource host property metrics may require preprocessing to render an n-dimensional vector. The host property metrics of each of the hosts are provided to a cluster-processing engine. The cluster-processing engine may use a clustering algorithm, such as a K-means clustering algorithm, to group the hosts into K clusters 401 and 402 based at least in part on the received n-dimensional property data vectors.

In an example embodiment, an n-dimensional vector of measured or reported statistics or metrics is used, whereby each vector may be associated with a host and time of data capture. Each entry or dimension in the n-dimensional vector may be dedicated for one category of host property metrics. The n-dimensional vector of host property data may be represented by a point in n-dimensional space, whereby two or more hosts who experience similar property and are under similar conditions are expected to be have corresponding points in n-dimensional space that are close to each other as measured by a distance metric, such as the Euclidean distance metric. Conversely, when two or more points in n-dimensional space are distant, as measured by a Euclidean distance, for example, the two or more points are said to represent associated hosts that are experiencing varying property or conditions.

A similarity measure between two clusters may be the mean distance between cluster means or cluster centroids or the equivalency of the frequency or size of a cluster. In one embodiment, a cluster may have a mean and a radius, whereby the mean is the geographic center of the cluster in n-dimensional space and the radius is the distance between the mean and a boundary of the cluster. The mean and radius may be used to determine whether two clusters are similar or equivalent. In addition, a statistical measure, such as the Mahalanobis distance, may determine the similarity or the affinity between two clusters.

Figure 5:
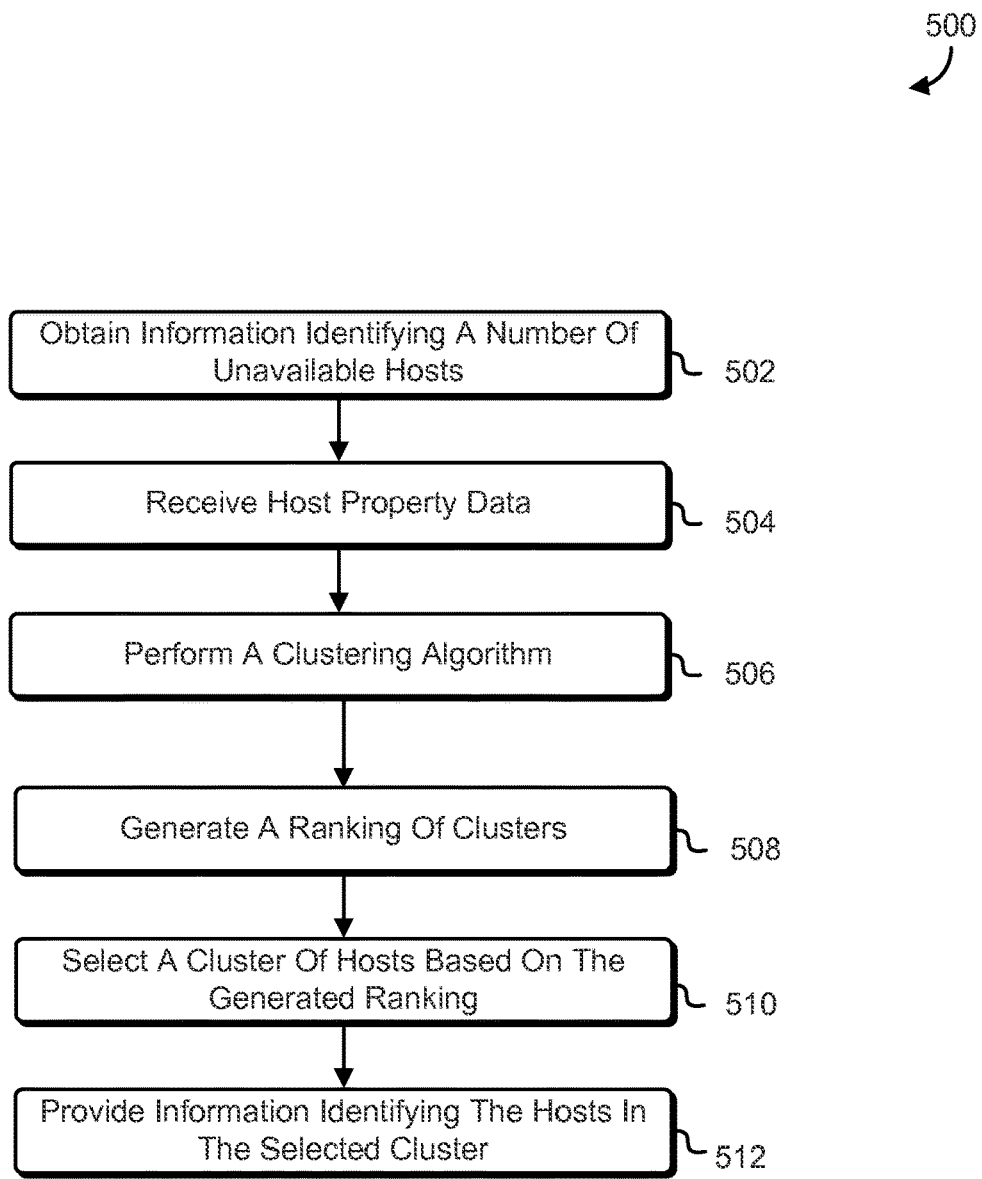
FIG. 5 is an illustrative example of a process for identifying related groups of resource hosts according to attribute values in accordance with at least one embodiment.

FIG. 5 is an illustrative example of a process 500 for identifying resource hosts with similar characteristics using a clustering process in accordance with at least one embodiment. The process 500 may be performed by a cluster-processing engine, such as the cluster-processing engine 250 described and depicted in connection with FIG. 2, or any suitable component thereof.

Returning to FIG. 5, a cluster-processing engine is configured to obtain information identifying a number of unavailable resource hosts (502), where the identified resource hosts may or may not have known reasons for being unavailable. The engine may further receive resource host property data for each of the identified resource hosts, where the property data includes hardware attributes and associated values for the attributes (504). The identified resource hosts may have the same or different attributes, as such, the property data for each resource host may contain different amounts of information and different values associated with the different attributes.

The cluster-processing engine may perform a clustering algorithm, using the obtained data set, to identify a set of clusters of resource hosts (506) and generate a ranking of clusters in the identified set of clusters of resource hosts (508). The cluster-processing engine may further be configured to select a cluster of resource hosts based at least in part on the generated ranking (510) and provide information identifying the resource hosts in the selected cluster (512).

Figure 6:
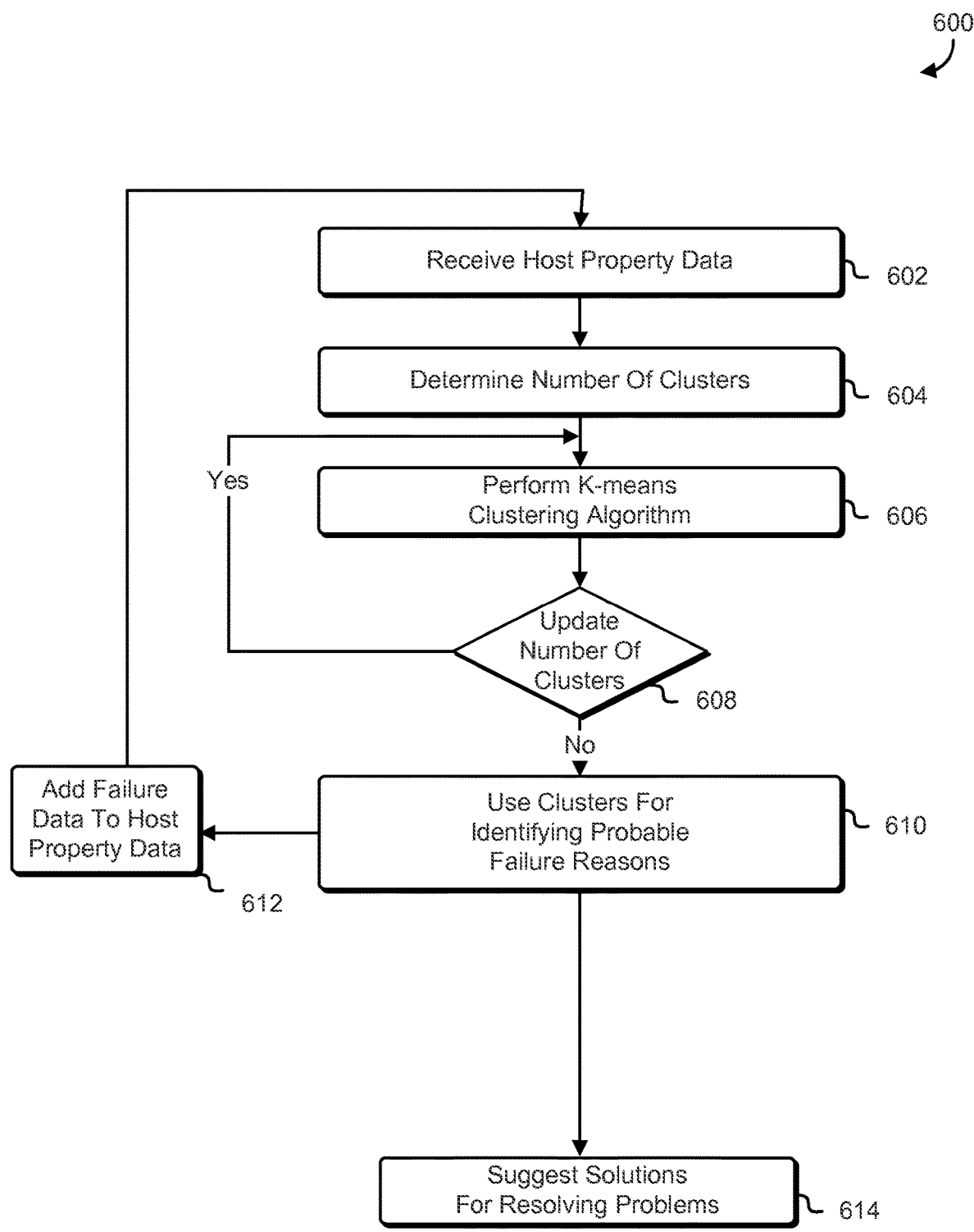
FIG. 6 is an illustrative example of a process for identifying similar clusters using K-means processing in accordance with at least one embodiment.

FIG. 6 is an illustrative example of a process 600 for identifying similar clusters using a K-means algorithm in accordance with at least one embodiment. The process 600 may be performed by a cluster-processing engine, such as the cluster-processing engine 250 described and depicted in connection with FIG. 2, or any suitable component thereof.

Returning to FIG. 6, a cluster-processing engine is configured to receive host property data (602). The cluster-processing engine then identifies the resource host attributes to use as an input for the K-means clustering process. Example embodiments further include the cluster-processing engine determining a number of clusters (604) in which the data points are to be classified. The number of clusters may be provided to the cluster-processing engine, for example, by a computing resource service provider or a component thereof, or the cluster-processing engine may be tasked with determining the appropriate number of clusters for the property data. It is noted that if the cluster-processing engine is tasked with determining the appropriate number of clusters, the cluster-processing engine may set the number of clusters to a low number such as one and update or increase the number of clusters as necessary. Or alternatively, the cluster-processing engine may set the number of clusters to a high number and update or increase the number of clusters as necessary.

The cluster-processing engine then performs a K-means clustering algorithm (606). The cluster-processing engine may select, for example, randomly, a centroid for each cluster and proceed to add data points to each cluster and recalculate the centroid. The cluster-processing engine then determines whether to update the number of clusters (608). In some example embodiments, when a centroid is calculated, the region associated with the centroid may be recorded and any rehabilitation suggestions or remediation suggestions related to that centroid may be recorded as historical data. The historical data may be later used by comparing any future centroids to the region, and suggesting the same or similar rehabilitation suggestion for resource hosts in clusters that have a same or similar centroid. The number of clusters may be updated if a more optimum clusters arrangement is available for the property data. For example, the cluster-processing engine may obtain historical data, based on previous algorithm deployments, to identify patterns or trends in the number of clusters previously used.

If the cluster-processing engine determines that the number of clusters requires updating, the cluster-processing engine again performs a K-means clustering algorithm on the host property data using the updated number of clusters (608). If, on the other hand, the cluster-processing engine determines that the number of clusters does not require updating, the cluster-processing engine uses the clusters for identifying probable failure or unavailability reasons as described herein (610). The cluster-processing engine determines if the identified failure or unavailability causes should be updated into the resource host property data to be used as historical data (612), if not, the cluster-processing engine is configured to provide one or more suggestions for resolving the identified failure or unavailability causes (614). For example, the cluster-processing engine may suggest a rehabilitation suggestion for resolving a failure based on an order, ranking, and/or prioritization of the clusters. For example, a prioritization ranking of the clusters, such as cluster priority list 110 as described and illustrated in connection with FIG. 1, may suggest that correcting the problem(s) associated with the highest ranked cluster will have the most impact. The suggestions for rehabilitation may further provide a priority list for the clusters that suggests that by fixing the problem(s) associated with a second ranked cluster will be the most cost effective and can be accomplished by a replacing an inexpensive component in all of the hosts within the second ranked cluster.

In further example embodiments, machine learning algorithms may be utilized to optimize the clustering algorithms selected, optimize the attributes that are the most valuable dependent upon the circumstances, and the like. For example partially-labeled supervised learning algorithms, feature selection machine learning algorithms, model selection machine learning algorithms, and the like may be employed to determine which sets or subsets of attributes are possibly useful for determining clusters and which sets or subsets of attributes are actually useful for determining clusters. For example, a historical metric may be monitored during the clustering process such that an amount of data of all of the problems that have been remediated or fixed is compiled. Such historical metrics provide data related to the clusters that have experienced problems and the solutions or possible solutions correlated to those problems.

Another example metric to collect for machine learning usage may include the amount a remedied hosts in a cluster, and the number of hosts for which the solution does and does not solve the problem. In other words, maintaining data related to the amount of propagation between the hosts in a cluster as related to the rehabilitation suggestions for each cluster and or for each host. Such historic data and metrics may further be utilized to optimize the clustering algorithms or attributes used in the clustering algorithms, and determining what attributes appear to be more important or useful in characterizing the health of a host or group of hosts.

Figure 7:
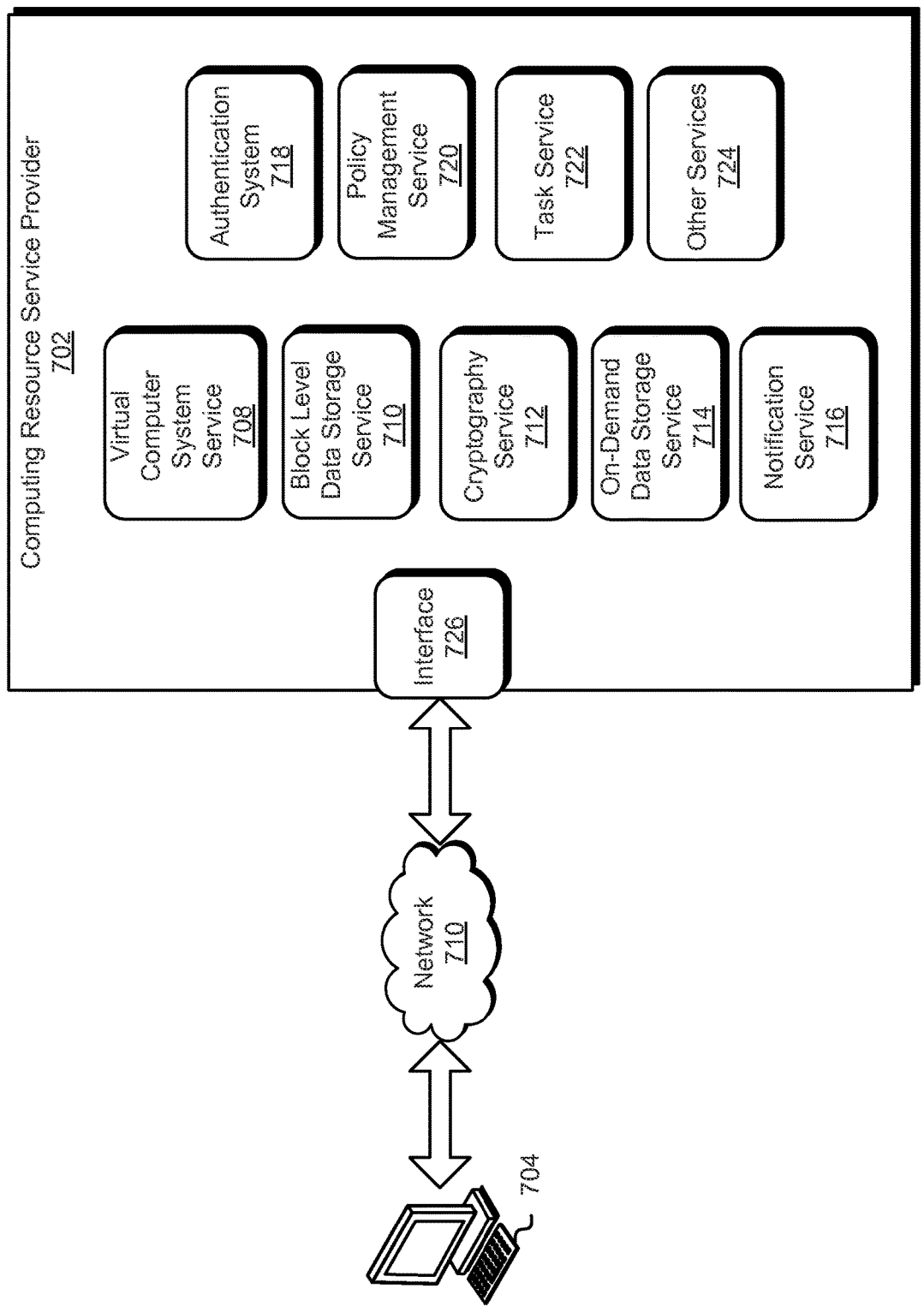
FIG. 7 is an illustrative example of an environment in accordance with at least one embodiment.

FIG. 7 shows an example of a customer connected to a computing resource service provider. The computing resource service provider 702 may provide a variety of services to a customer 704.

The customer 704 may be an organization that may utilize one or more of the services provided by the computing resource service provider 702 to maintain and deliver information to its employees, which may be located in various geographical locations. Additionally, the customer 704 may be an individual that utilizes the services of the computing resource service provider 702 to deliver content to a working group located remotely. As shown in FIG. 7, the customer 704 may communicate with the computing resource service provider 702 through a network 710, whereby the network may be a communication network, such the Internet, an intranet or an Internet service provider (ISP) network. Some communications from the customer 704 to the computing resource service provider 702 may cause the computing resource service provider 702 to operate in accordance with one or more embodiment described herein or a variation thereof.

The computing resource service provider 702 may provide various computing resource services to its customers. The services provided by the computing resource service provider 702, in this example, include a virtual computer system service 708, a block-level data storage service 710, a cryptography service 712, an on-demand data storage service 714 and one or more other services 724. It is noted that not all embodiments described herein include the services 708-724 of the computing resource service provider 702 and additional services may be provided in addition to or as an alternative to services explicitly described herein. Each of the services may include one or more web service interfaces that enable the customer 704 to submit appropriately configured API calls to the various services through web service requests. In addition, each of the services may include one or more service interfaces that enable the services to access each other (e.g., to enable a virtual computer system of the virtual computer system service 708 to store data in or retrieve data from the on-demand data storage service 714 and/or to access one or more block-level data storage devices provided by the block level data storage service 710).

The virtual computer system service 708 may be a collection of computing resources configured to instantiate virtual machine instances onto virtual computing systems on behalf of the customers 704 of the computing resource service provider 702. Customers 704 of the computing resource service provider 702 may interact with the virtual computer systems' service (via appropriately configured and authenticated API calls) to provision and operate virtual computer systems that are instantiated on physical computing devices hosted and operated by the computing resource service provider 702. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications.

The block-level data storage service 710 may comprise one or more computing resources that collectively operate to store data for a customer 704 using block-level storage devices (and/or virtualizations thereof). The block-level storage devices of the block-level data storage service 710 may, for instance, be operationally attached to virtual computer systems provided by the virtual computer system service 708 to serve as logical units (e.g., virtual drives) for the computer systems. A block-level storage device may enable the persistent storage of data used/generated by a corresponding virtual computer system where the virtual computer system service 708 may only provide ephemeral data storage.

The computing resource service provider 702 may also include an on-demand data storage service 714. The on-demand data storage service 714 may be a collection of computing resources configured to synchronously process requests to store and/or access data. The on-demand data storage service 714 may operate using computing resources (e.g., databases) that enable the on-demand data storage service 714 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 714 may be organized into data objects. The data objects may have arbitrary sizes except, perhaps, for certain constraints on size. Thus, the on-demand data storage service 714 may store numerous data objects of varying sizes. The on-demand data storage service 714 may operate as a key value store that associates data objects with identifiers of the data objects which may be used by the customer 704 to retrieve or perform other operations in connection with the data objects stored by the on-demand data storage service 714. The on-demand data storage service 714 may also be accessible to the cryptography service 712. For instance, in some embodiments, the cryptography service utilizes the on-demand data storage service to store keys of the customers in encrypted form, where keys usable to decrypt the customer keys are accessible only to particular devices of the cryptography service 712. Access to the data storage service by a customer, another service, or other entity may be through appropriately configured API calls.

In the environment illustrated in FIG. 7, a notification service 716 is included. The notification service 716 may comprise a collection of computing resources collectively configured to provide a web service or other interface and browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes such as monitoring applications executing in the virtual computer system service, workflow systems, time-sensitive information updates, mobile applications, and many others.

The computing resource service provider 702 may additionally maintain one or more other services 724 based at least in part on the needs of its customers 704. For instance, the computing resource service provider 702 may maintain a database service for its customers 704. A database service may be a collection of computing resources that collectively operate to run one or more databases for one or more customers 704. Customers 704 of the computing resource service provider 702 may operate and manage a database from the database service by utilizing appropriately configured API calls. This, in turn, may allow a customer 704 to maintain and potentially scale the operations in the database. Other services include, but are not limited to, object-level archival data storage services, services that manage and/or monitor other services and/or other services.

As illustrated in FIG. 7, the computing resource service provider 702, in various embodiments, includes an authentication system 718 and a policy management service 720. The authentication system, in an embodiment, is a computer system (i.e., collection of computing resources) configured to perform operations involved in authentication of users of the customer. For instance, one of the services may provide information from the users to the authentication service to receive information in return that indicates whether or not the user requests are authentic.

The policy management service 720, in an embodiment, is a computer system configured to manage policies on behalf of customers of the computing resource service provider. The policy management service 720 may include an interface that enables customers to submit requests related to the management of policy. Such requests may, for instance, be requests to add, delete, change or otherwise modify policy for the customer or for other administrative actions, such as providing an inventory of existing policies and the like. Other services and/or components may also be included in the environment 700. Similarly, techniques of the present disclosure apply to other environments.

Figure 8:
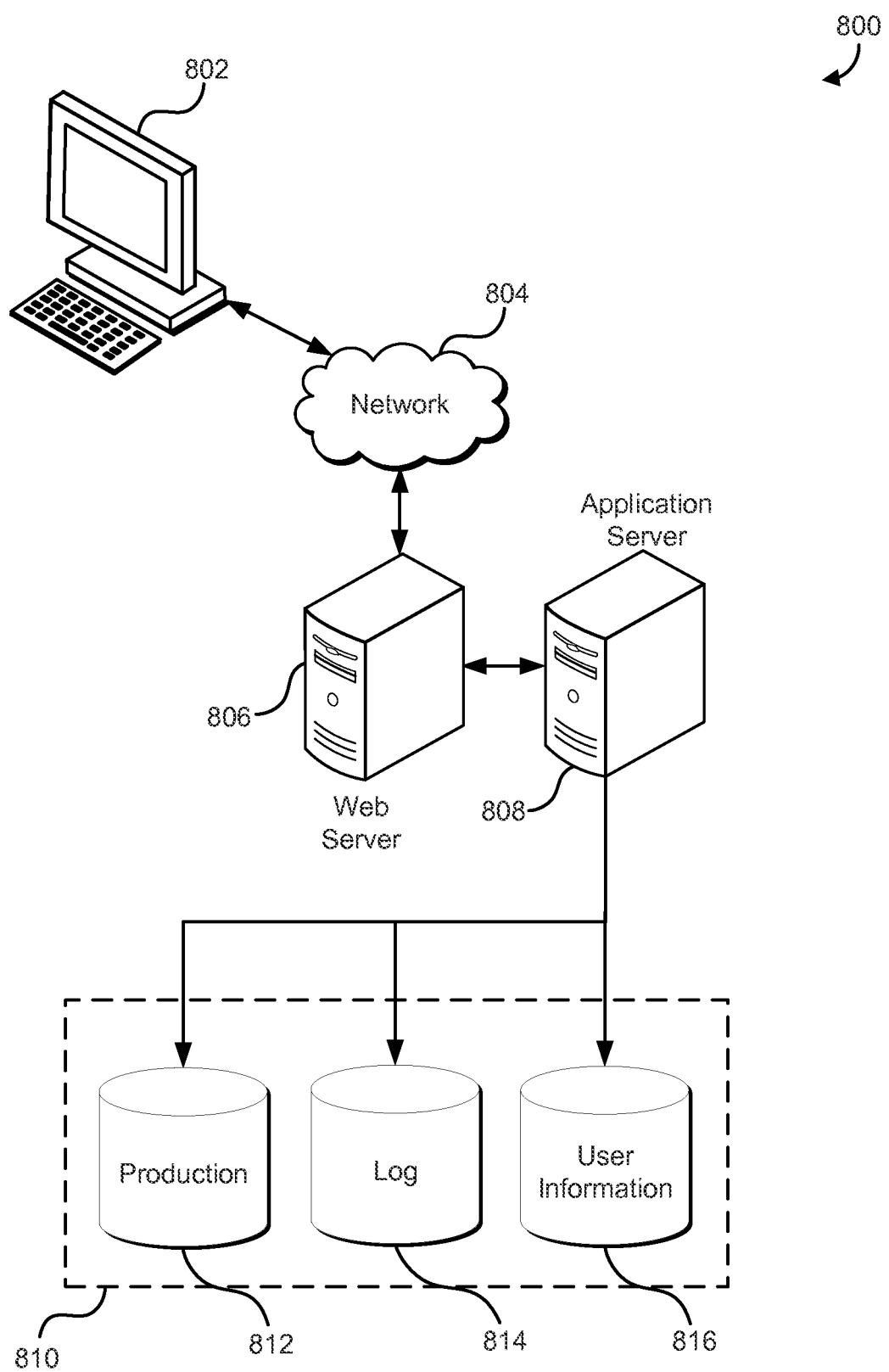
FIG. 8 illustrates a customer connected to a computing resource service provider in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining information identifying a plurality of resource hosts in abnormal operation;
    obtaining a data set for the plurality of resource hosts in abnormal operation, the data set comprising, for each resource host of the plurality of resource hosts in abnormal operation, values for a set of attributes associated with the resource host;
    performing a clustering algorithm, using the obtained data set, to identify a set of clusters of resource hosts;
    generating a ranking of clusters in the identified set of clusters of resource hosts, the ranking generated based on an estimate of an amount of computer processing to be performed on each cluster of the set of clusters;
    selecting a cluster based at least in part on the generated ranking; and
    providing information identifying resource hosts in the selected cluster.

2. The computer-implemented method of claim 1, further comprising adjusting the ranking based on a cause of the abnormal operation associated with the each cluster of the set of clusters.

3. The computer-implemented method of claim 1, wherein obtaining the data set for the plurality of resource hosts in abnormal operation comprises collecting the values for the set of attributes of the resource host from a report including resource host property data.

4. The computer-implemented method of claim 3, further comprising:

maintaining an association of resource hosts in abnormal operation to the report; and in response to a new report, updating the association.

5. The computer-implemented method of claim 1, wherein the generating of the ranking of the clusters in the identified set of clusters of resource hosts further comprises adjusting the ranking of the clusters based on a cost associated with one or more actions to rehabilitate the plurality of resource hosts in abnormal operation.

6. A system, comprising at least one computing device configured to implement one or more services, wherein the one or more services are configured to:

obtain a data set for a plurality of resource hosts identified as being in abnormal operation, the data set, for each resource host of the plurality of resource hosts, comprising at least one value for at least one attribute of the resource host;

perform a clustering algorithm, using the data set, to group at least a subset of the plurality of resource hosts among a set of clusters;

rank each cluster of the set of clusters of the plurality of resource hosts based at least in part on a type of storage volume associated with the each cluster;

select a cluster based at least in part on an associated rank of the cluster; and provide information identifying resource hosts in the selected cluster.

7. The system of claim 6, wherein the at least one value for the at least one attribute of the resource host includes a set of categorical values, ordinal values and/or numeric values, the values being generated based at least in part on resource host property data.

8. The system of claim 6, wherein the one or more services are further configured to determine one or more clustering algorithms usable to identify the set of clusters wherein the determination is based, at least in part, on types of attributes in the obtained data set.

9. The system of claim 8, wherein the set of clusters specifies resource hosts in abnormal operation and each cluster of the set of clusters specifies resource hosts associated with a same type of abnormal operation.

10. The system of claim 9, wherein the one or more services are further configured to provide a suggestion to recover the resource hosts in abnormal operation, based at least in part on a subset of the set of clusters.

11. The system of claim 6, wherein the one or more services are further configured to:

associate one or more regions in a space of at least one cluster of the set of clusters;

determine a centroid of the at least one cluster;

match the centroid to the one or more regions; and determine a suggestion associated with recovery of the resource hosts in abnormal operation for the at least one cluster based at least in part on the centroid.

12. The system of claim 6, wherein the at least one value for the at least one attribute of the resource host includes system property report data, a number of read or write requests, a time/date of a last hardware replacement, a manufacturer, a manufacturer of a network card, a software version running on a host, a physical location of the at least a subset of the plurality of resource hosts among a set of clusters, environmental conditions in a location of the at least a subset of the plurality of resource hosts among a set of clusters, a hardware batch identifier, a date the at least a subset of the plurality of resource hosts among a set of clusters were received from a third-party, a number of self-monitoring, analysis, and reporting technology errors, and/or a device type of the at least a subset of the plurality of resource hosts among a set of clusters.

13. The system of claim 6, wherein the one or more clustering algorithms include a K-means clustering algorithm, an expectation-maximization clustering algorithm, a Biclustering algorithm, or a hierarchical clustering algorithm.

14. A non-transitory computer-readable storage medium storing thereon executable instructions that, as a result of being executed by one or more processors of a computer system, cause the computer system to at least:

obtain, for a plurality of nodes identified as being in abnormal operation, attribute types and values of the attribute types;

use the values of the attribute types as input to a clustering algorithm to identify a set of clusters of nodes from the plurality of nodes, wherein at least one cluster of the set of clusters of nodes is associated with a possible cause of abnormal operation;

generate a ranking of clusters of the set of clusters of nodes based at least in part on a number of nodes associated with each cluster of nodes and a customer entity associated with the each cluster of nodes;

select a cluster based at least in part on an associated rank of the cluster; and provide information identifying nodes of the selected cluster.

15. The non-transitory computer-readable storage medium of claim 14, wherein the instructions further comprise instructions that, as a result of being executed by the one or more processors, cause the computer system to perform cluster processing using K-means clustering, expectation-maximization clustering, hierarchical clustering, or Biclustering.

16. The non-transitory computer-readable storage medium of claim 14, wherein the instructions further comprise instructions that, as a result of being executed by the one or more processors, cause the computer system to store, in one or more data storage services, information identifying one or more nodes corresponding to a subset of the at least one cluster.

17. The non-transitory computer-readable storage medium of claim 16, wherein the instructions that cause the computer system to store the information identifying the one or more nodes further include instructions that cause the computer system to prioritize a first subset of the at least one cluster over at least a second subset of the at least one cluster.

18. The non-transitory computer-readable storage medium of claim 14, wherein the instructions that cause the computer system to generate the ranking of the clusters further include instructions that cause the computer system to optimize the clustering algorithm based at least in part on a machine learning algorithm including optimizing selection of attributes.

19. The non-transitory computer-readable storage medium of claim 14, wherein the instructions further comprise instructions that, as a result of being executed by the one or more processors, cause the computer system to determine, for the identified nodes, one or more remedies for the possible causes of the nodes in abnormal operation.

20. The non-transitory computer-readable storage medium of claim 14, wherein a node in abnormal operation includes an offline node, a failed node, an unavailable node, a non-responsive node, and/or a disconnected node.

21. The non-transitory computer-readable storage medium of claim 14, wherein the information identifying the nodes of the selected cluster includes a suggestion to recover the nodes.

* * * * *